US012752383B2

(12) United States Patent
Mora Herrera

(10) Patent No.: US 12,752,383 B2
(45) Date of Patent: Oct. 6, 2026

(54) HYDRAULIC TENSION ADAPTOR

(71) Applicant: Henry Esteban Mora Herrera, Quito (EC)

(72) Inventor: Henry Esteban Mora Herrera, Quito (EC)

( * ) Notice: Subject to any disclaimer, the term of this patent is extended or adjusted under 35 U.S.C. 154(b) by 300 days.

(21) Appl. No.: 18/463,127

(22) Filed: Sep. 7, 2023

(65) Prior Publication Data

US 2024/0075566 A1 Mar. 7, 2024

Related U.S. Application Data

(60) Provisional application No. 63/374,795, filed on Sep. 7, 2022.

(51) Int. Cl.
*B23P 19/06* (2006.01)
*B25B 29/02* (2006.01)

(52) U.S. Cl.
CPC ............ *B23P 19/067* (2013.01); *B25B 29/02* (2013.01); *B23P 2700/11* (2013.01)

(58) Field of Classification Search
CPC ...... F16L 23/024; F16L 23/036; B25B 29/02; B23P 19/067; B23P 2700/11
USPC .......................................................... 81/57.38
See application file for complete search history.

(56) References Cited

U.S. PATENT DOCUMENTS

2014/0075741 A1* 3/2014 Travis .................. F16L 23/024 29/525.11

* cited by examiner

*Primary Examiner* — Katina N. Henson

(57) ABSTRACT

A hydraulic tension adaptor comprising a flange housing, a bolt support retainer, a bolt tensioning piston, a plurality of stud assemblies, and a retainer ring. The bolt tensioning piston houses a portion of the bolt support retainer. The bolt support retainer threadedly engages with the flange housing. The retainer ring threadedly engages with the bolt support retainer. Ports located on the bolt tensioning piston allow pressure to be exerted on the system via supply and bleed ports, thus applying tension to the plurality of stud assemblies simultaneously.

17 Claims, 14 Drawing Sheets

SECTION A-A

HYDRAULIC TENSION ADAPTOR

FIELD OF THE INVENTION

The present invention relates generally to a hydraulic tensioning adapter system configured to tension the studs once the nuts have been hand tighten thus, coupling flanges together. More specifically, the adaptor provides a solid connection between two flange components without using any tools.

BACKGROUND OF THE INVENTION

In making up a flange to flange connection studs and nut are used to secure the connection together. The use of conventional hydraulic, pneumatic and hammer wrenches are used to make up the connection by torqueing the bolts. However, bolting should be tightened to a pre-determined uniform tension force. If not, they may become loose due to vibrating. Moreover, if the bolts are over-tightened, they will become overstressed and rupture. When torqueing bolts, it is difficult to achieve accurate tension due to the friction between the nut and the stud and the type of grease used to lubricate the threads on the studs. Bolt tensioning systems are currently in use; however, these systems can only tension one bolt at a time and require special tools and modified nuts to adjust the nuts on the studs to retain tension. Moreover, due to the size and weight of tools and parts, workers are exposed to considerable risk of injury or death in the event of a mishap. In some cases, heavy equipment is suspended overhead while the personnel is in a closed environment making up equipment with flange connections exposing them to longer make-up times. Thus, there is a continuing need for an improved bolt tensioning system which accurately and uniformly tensions bolts when coupling flanges, as well as other types of connections safely, quickly, simultaneously, and at a reduced cost and less risk of injury to personnel.

An objective of the present invention is to provide a flange adaptor assembly that couples two flange components together and tensions the studs with nuts without the use of pneumatic, hydraulic, and hammer wrenches, or similar tools. Further, the present invention utilizes an external retention ring to provide additional safety. The bolt tensioning system can be used with various bolt sizes and lengths in any application that requires coupling two mating flanges together. Extended studs on the bolt tensioning system are ported through the connecting mating flange holes and nuts are threaded onto the bolts by hand and hand tighten. Hydraulic fluid under pressure is applied to a port in the tensioning system housing and applies tension to all the bolts at the same time tensioning accurately and uniformly all the bolts. The present invention, also referred to as the "Hydraulic Tension Adaptor (HTA)," reduces time spent on personnel making up the flange connections from hours to minutes. Additional features and benefits are further discussed in the sections below.

SUMMARY OF THE INVENTION

A hydraulic tension adaptor comprising a flange housing with ring grooves, a bolt support retainer, a bolt tensioning piston, a plurality of stud assemblies, and a retainer ring. The bolt tensioning piston houses a portion of the bolt support retainer. The threaded bolt support retainer engages with the flange housing. The threaded retainer ring engages with the bolt support retainer. Hydraulic ports located on the bolt tensioning piston allow pressure to be exerted on the system via the supply and bleed ports, thus applying tension to the plurality of stud assemblies simultaneously. The system also incorporates a hydraulic port used to lower the bolt tensioning piston insuring all the studs are fully extended.

DETAIL DESCRIPTIONS OF THE INVENTION

Figure 1:
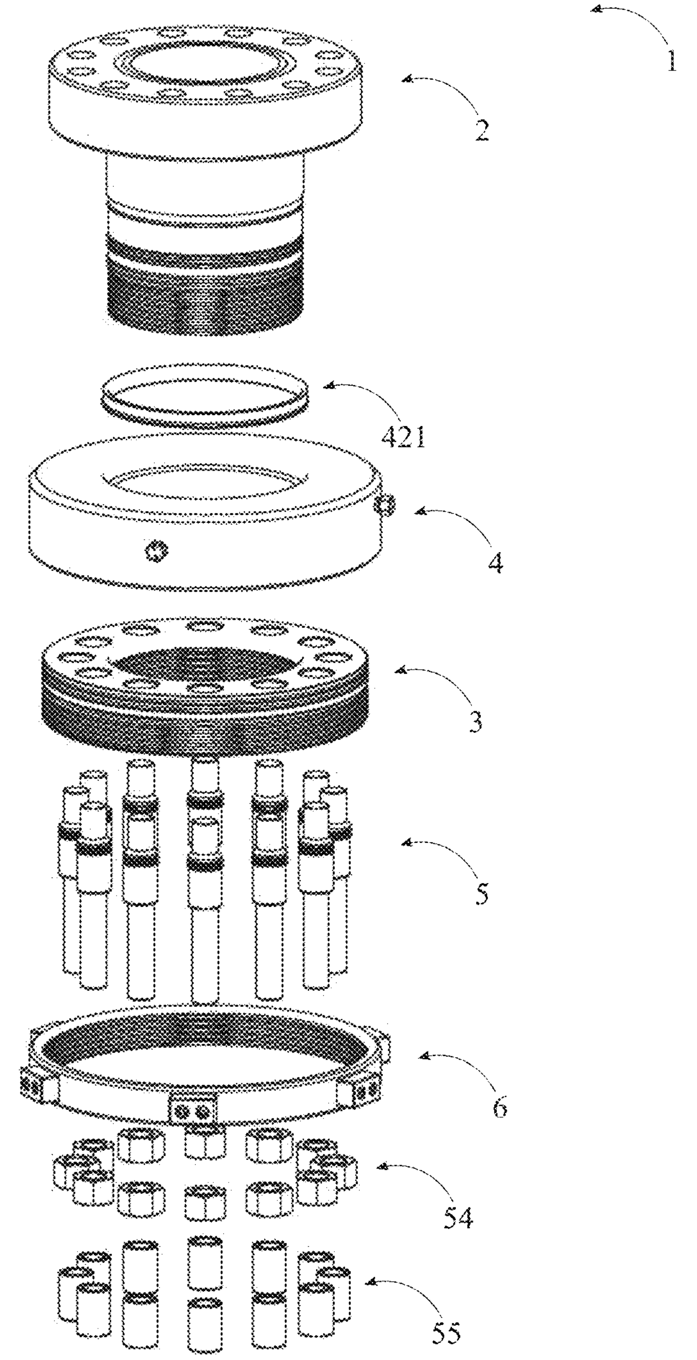
FIG. 1 is an exploded view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a hydraulic tension adaptor 1, embodiments of the present disclosure are not limited to use only in this context. Within the context of the present invention, herein FIGS. 1-14 are representative of the present invention and its respective embodiments.

Figure 2:
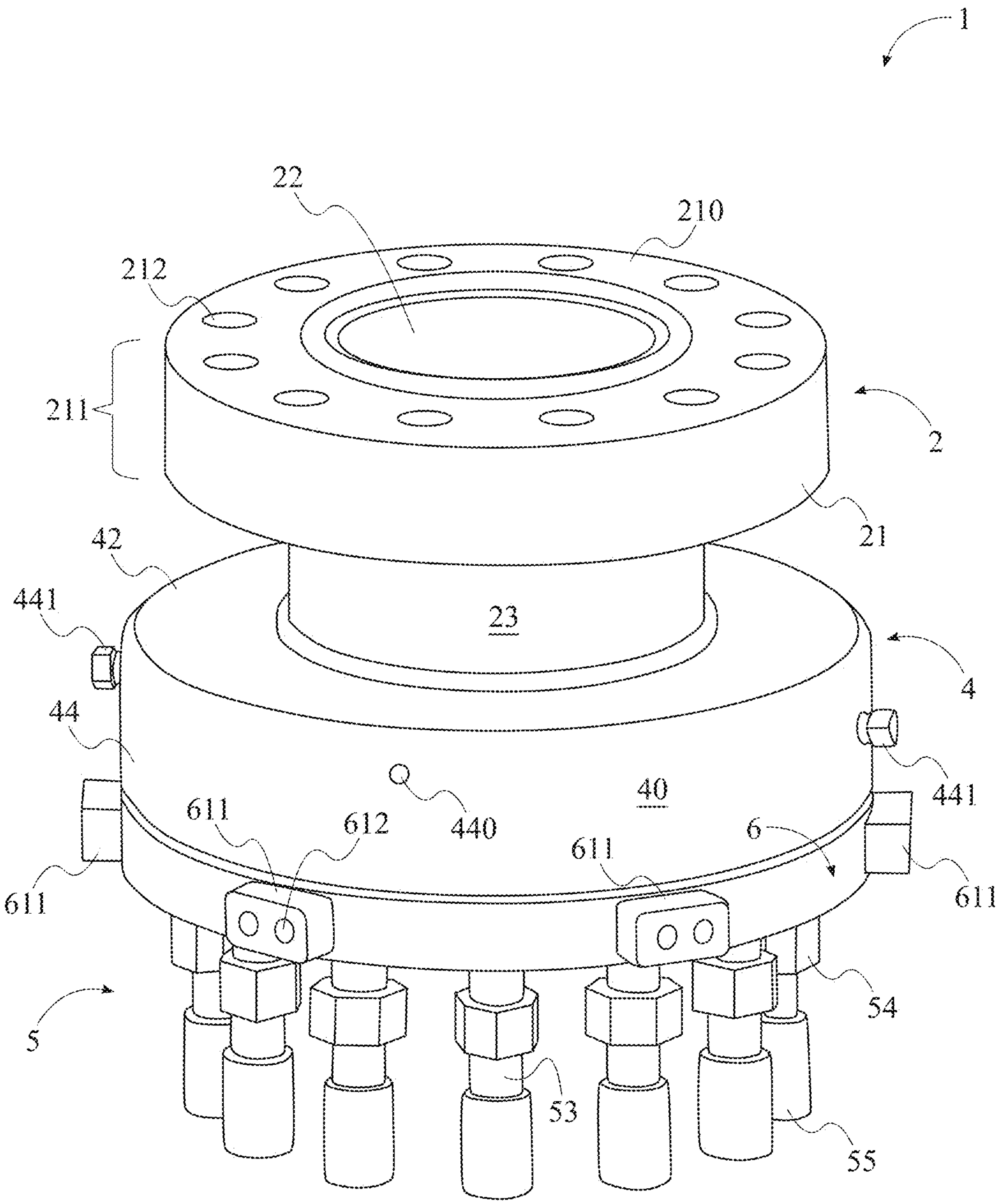
FIG. 2 is a front perspective view of the present invention.

As shown in FIG. 1 and FIG. 2, the present invention is a hydraulic tension adaptor 1 comprising a flange housing 2, a secondary piston ring 421, a bolt support retainer 3, a bolt tensioning piston 4, a plurality of stud assemblies 5, and a retainer ring 6. In the preferred embodiment, the flange housing 2 is coupled to the bolt support retainer 3. The bolt support retainer 3 is at least partially housed within the bolt tensioning piston 4. The secondary piston ring 421 is secured between the flange housing 2 and the bolt tensioning piston 4. The retainer ring 6 threadedly couples to the bolt support retainer 3. The plurality of stud assemblies 5 traverse the bolt support retainer 3 and fit within the bolt tensioning piston 4, thus securing the present invention to a mating flange 9. Within the context of the present invention, the mating flange 9 is also referred to herein as a wellhead 9.

Figure 3:
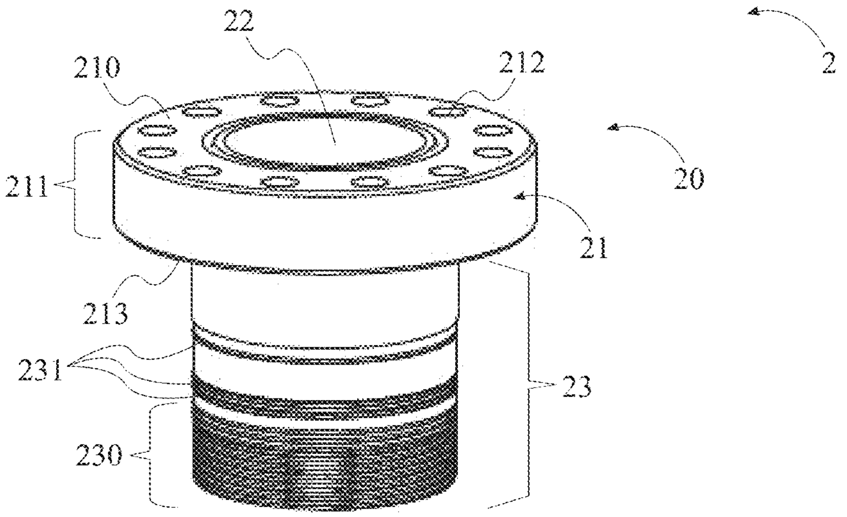
FIG. 3 is a front perspective view of the flange housing of the present invention.

As shown in FIG. 3, the flange housing 2 is a T-shaped ring gasket comprising ring gasket grooves 20 comprising a rim 21 and a barrel 23. The barrel 23 is a cylindrical structure wherein the rim 21 protrudes outwardly from the barrel 23. The flange housing 2 further comprises a center hole 22 concentrically traversing through the rim 21 and the barrel 23. In the preferred embodiment of the present invention, the rim 21 comprises a top face 210, and a bottom face 213. The top face 210 of the rim 21 is oppositely parallel to the bottom face 213, separated by a thickness 211. Furthermore, within the preferred embodiment of the present invention, the rim 21 further comprises a plurality of through holes 212, equidistantly spaced, traversing the thickness 211 of the rim 21 from the top face 210 to the bottom face 213. In the preferred embodiment, the barrel 23 comprises external threads 230 positioned on the outwardly circumferential surface of the barrel 23. In the preferred embodiment of the present invention, the external threads 230 traverse a portion of the distal end of the barrel 23, wherein said distal end is opposite from the rim 21. Additionally, the barrel 23 further comprises a plurality of O-ring supports 231 wherein said O-ring supports 231 are extruded grooves located on the outwardly facing surface of the barrel 23. In the preferred embodiment, the plurality of O-ring supports 231 are proximally located on the barrel 23. The plurality of O-ring supports 231 receive a plurality of O-rings 232 whereby each O-ring support 231 of the plurality receives an O-ring 232.

Figure 4:
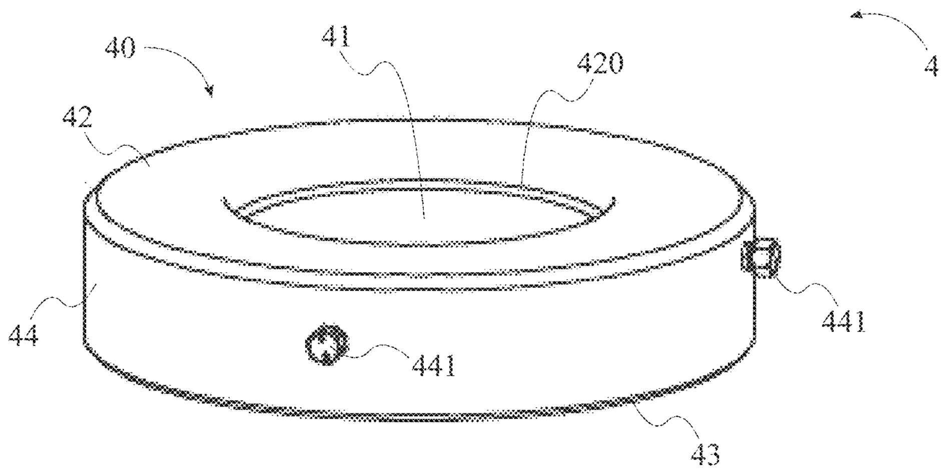
FIG. 4 is a front perspective view of the bolt tensioning piston of the present invention.

As shown in FIG. 4, the bolt tensioning piston 4 is a circular housing 40 comprising an aperture 41 whereby the aperture 41 is concentrically located through the housing 40. In the preferred embodiment, the housing 40 further comprises a top surface 42, a bottom surface 43, and an outer face 44. The top surface 42 is oppositely parallel to the bottom surface 43, wherein the outer face 44 is the outwardly facing circumferential surface of the housing 40. In the preferred embodiment, the top surface 42 comprises a cutout 420 wherein said cutout 420 is circumferentially positioned, proximate to the aperture 41, whereby the cutout 420 forms a lip-like structure about the aperture 41. In the preferred embodiment, the cutout 420 receives the secondary piston ring 421. In the preferred embodiment, the bottom surface 43 of the bolt tensioning piston 4 comprises a retainer recess 430 and a plurality of slots 431. The retainer recess 430 is a depression in the bottom surface 43 of the bolt tensioning piston 4 wherein at least a portion of the bolt support retainer 3 is received. Additionally, the plurality of slots 431 are cavities wherein the stud assemblies 5 are inserted. Moreover, bolt tensioning piston 4 further comprises an at least one bleed port 440 wherein said bleed port 440 is a channel extruding into the outer surface 44 of the bolt tensioning piston 4. In the preferred embodiment of the present invention, the at least one bleed port 440 is a plurality of bleed ports 440 positioned proximate the circumference of the bolt tensioning piston 4. In the preferred embodiment of the present invention, the at least one bleed port 440 removably receives an at least one plug 441.

Figure 5:
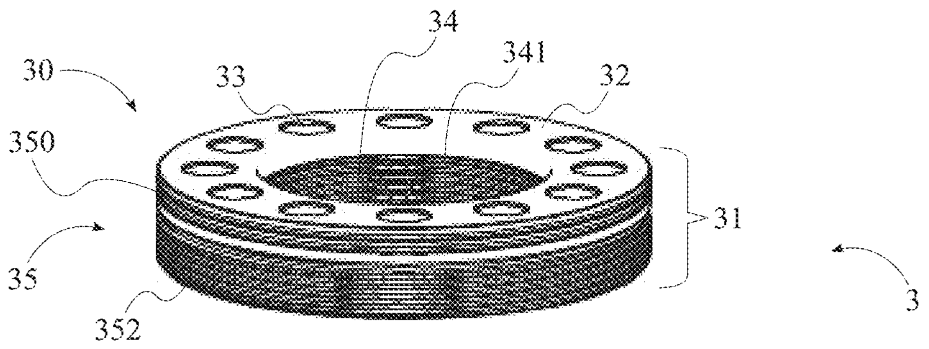
FIG. 5 is a front perspective view of the bolt support retainer of the present invention.

The bolt support retainer 3, as shown in FIG. 5, is a threaded flange 30 comprising a bore 34, a thickness 31, a top surface 32, a plurality of through holes, and an outer surface 35. The bore 34 is a threaded bore 34 concentrically positioned through the bolt support retainer 3. The plurality of through holes traverse the thickness 31 of the threaded flange 30 from the top surface 32 of the bolt support retainer 3. The outer surface 35 of the bolt support retainer 3 is the outwardly facing circumferential surface of the bolt support retainer 3. The outer surface 35 of the bolt support retainer 3 comprises an O-Ring support 350 and an external thread 352. The O-ring support is an extruded groove about the outer surface 35 of the bolt support retainer 3, wherein said O-ring support 350 receives an O-ring 351. The external thread 352 traverses a portion of the outer surface 35 of the bolt support retainer 3. In the preferred embodiment, the bore 34 of the bolt support retainer 3 threadedly engages with the external threads 230 of the barrel 23 of the flange housing 2.

Figure 6:
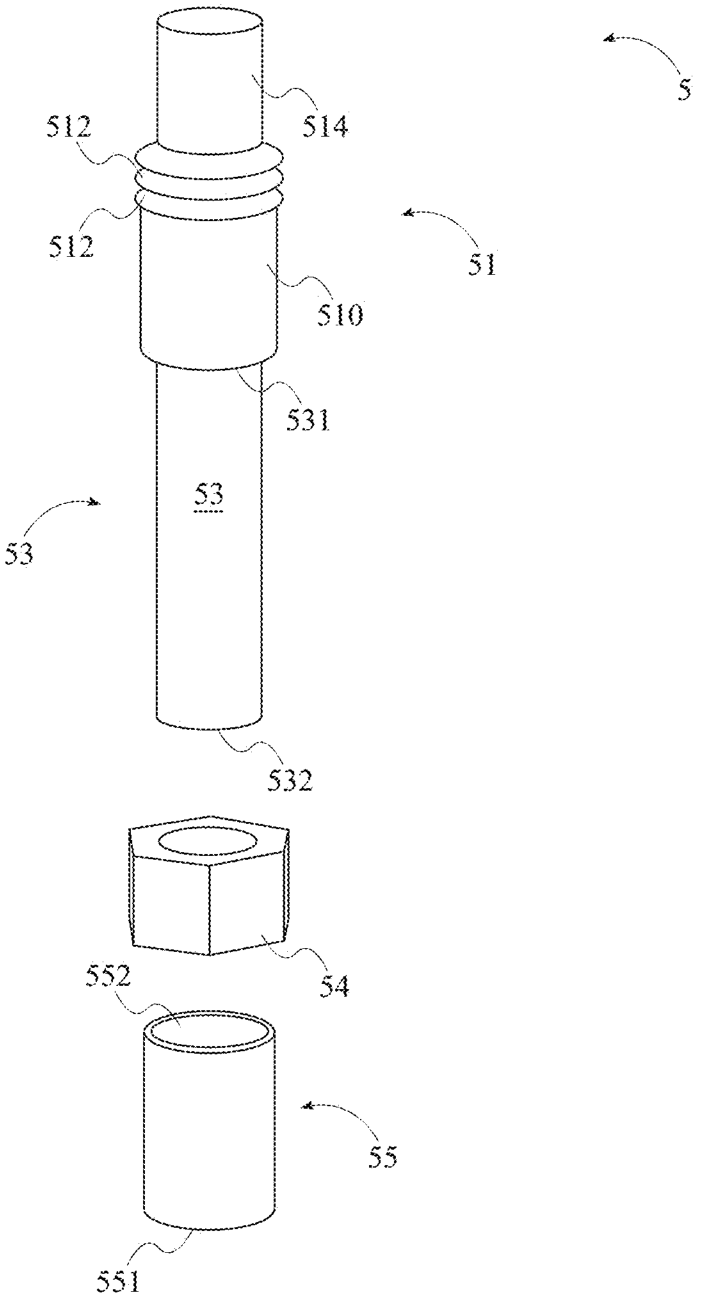
FIG. 6 is an exploded view of the stud assembly of the present invention.
Figure 9:
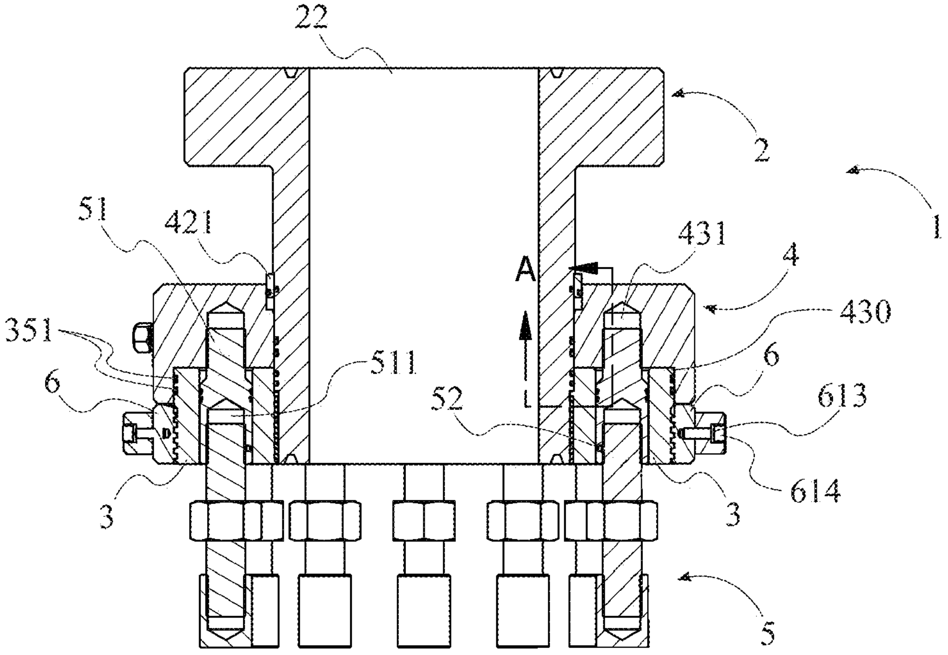
FIG. 9 is a sectional view of the present invention along line A-A.

As shown in FIG. 6 and FIG. 9, each stud assembly 5 of the plurality of stud assemblies 5 comprise a bolt retainer bushing 51, a grub screw 52, a stud 53, and a nut 54. The bolt retainer bushing 51 is a housing 514 comprising a cavity 511, plurality of O-ring supports 512 and a shaft. The cavity 511 receives the stud 53. The outwardly facing surface of the bolt retainer bushing 51 comprises the shaft which extended outwardly from the housing 514 and the plurality of O-ring supports 512 traverse the circumference of the housing 514. In the preferred embodiment, the plurality of O-ring supports 512 receive a plurality of O-rings 513. The stud 53 is a threaded rod comprising a first distal end 531 and a second distal end 532 whereby the first distal end 531 is opposite the second distal end 532. The first distal end 531 of the stud 53 is received by the bolt retainer bushing 51. The grub screw 52 secures the bolt retainer housing 514 to the first distal end 531 of the stud 53. The nut 54 is threadedly coupled to the stud 53, via the second distal end 532. In some embodiments of the present invention, the second distal end 532 of the stud 53 comprises a stud protector 55. The stud protector 55 is a cylindrical tube casing 550 comprising an closed end 551 and an open end 552. In some embodiments of the present invention, the stud protector 55 is slid onto the second distal end 532 of the stud 53 via the open end 552.

Figure 7:
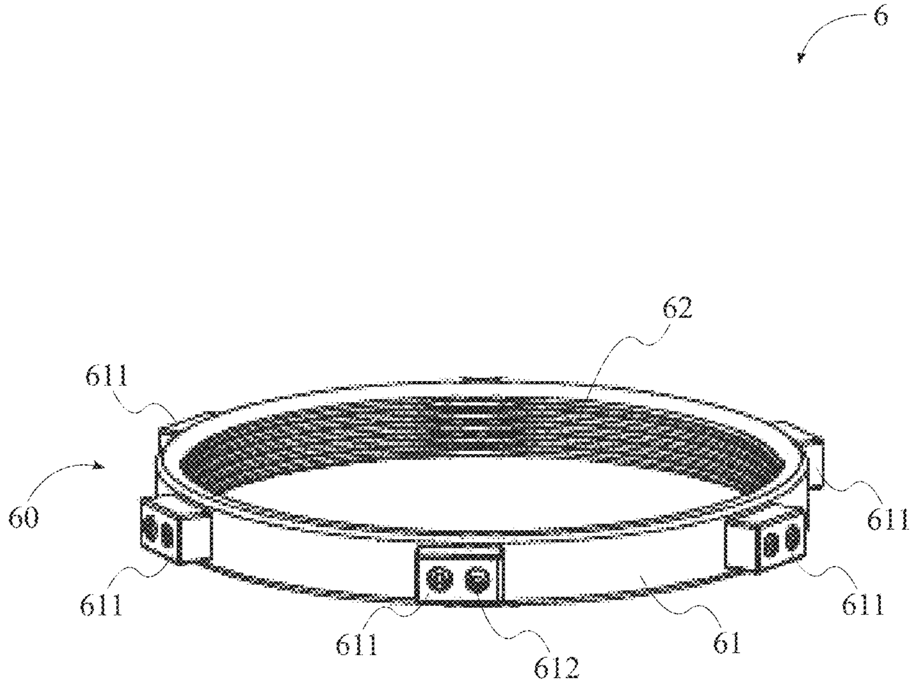
FIG. 7 is a front perspective view of the retainer ring of the present invention.

The retainer ring 6, as shown in FIG. 7, is a circular collar 60 comprising an outward surface 61 and an inward surface 62. The outward surface is the outwardly facing circumferential surface of the retainer ring 6. Contrarily, the inward surface 62 is the inwardly facing circumferential surface of the retainer ring 6. The inward surface 62 comprises threads wherein said inward surface 62 threadedly engages with the external thread of the bolt support retainer 3. The outward surface of the retainer ring 6 comprises a plurality of retainer ring 6 rotator blocks 611. In the preferred embodiment, the plurality of retainer ring 6 rotator blocks 611 are equally spaced about the outward circumference of the retainer ring 6. Each retainer ring 6 rotating block 611 comprises a plurality of seated screw holes 612 wherein each seated screw hole 612 comprises a lock washer 613 and a shoulder bolt 614. The shoulder bolt 614 secures the retainer ring 6 to the bolt support retainer 3.

Figure 8:
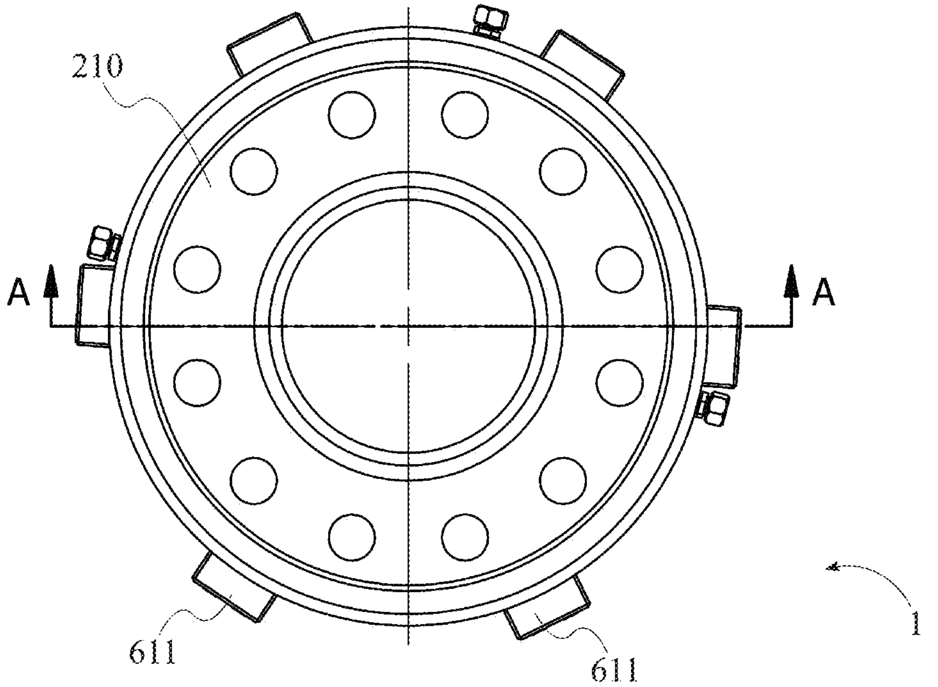
FIG. 8 is a top view of the present invention showing section line A-A dissecting such.
Figure 10:
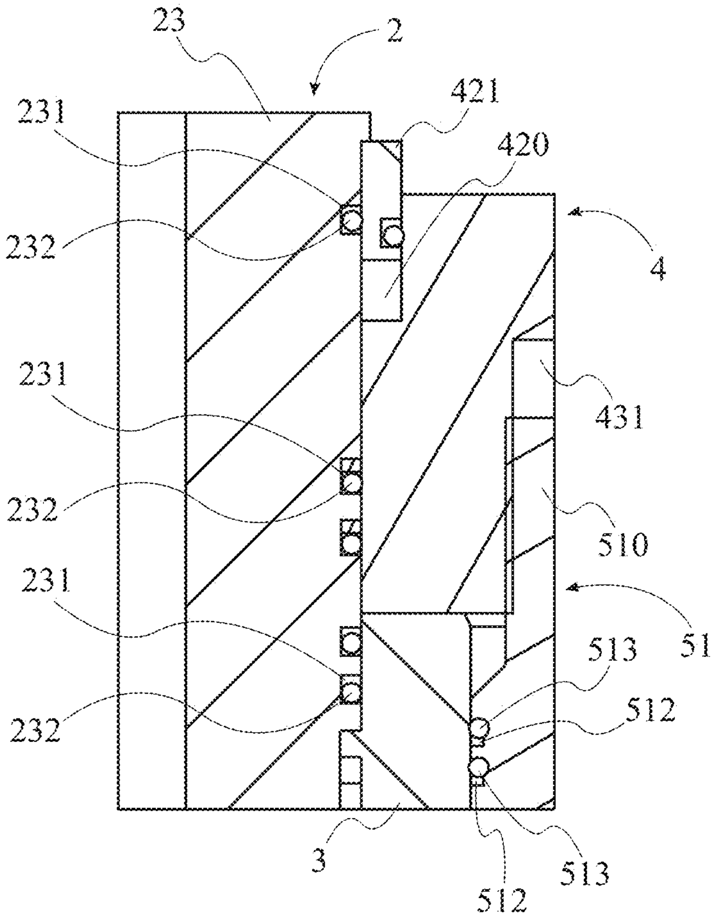
FIG. 10 is a detail view of detail A of the present invention.

As shown in FIG. 8, FIG. 9, and FIG. 10, the O-ring supports provide a support for the O-rings whereby the O-rings act as a seal between components. In the preferred embodiment of the present invention, the bolt support retainer 3 and the bolt tensioning piston 4 engage the barrel 23 of the flange housing 2, concentrically. The secondary piston ring 421 is seated in between the barrel 23 and the bolt tensioning piston 4. Furthermore, as shown in FIGS. 8-10, each shaft of the bolt retainer bushing 51 of the plurality of stud assemblies 5 is inserted into the plurality of slots. Further, the plurality of O-rings 513 provide a seal between the bolt retainer bushing 51 and the plurality of through holes 33 of the bolt support retainer 3. In the preferred embodiments, a hydraulic pressure is applied to the system through the plurality of ports 440. In the preferred embodiments, the bolt tensioning piston 4 housing translates laterally upward when hydraulic pressure is applied to one of the plurality ports 440. The plurality of supply/bleed ports 440 allow pressure to be exerted on the system via the supply/bleed ports 440, thus applying tension to the plurality of stud assemblies 5 simultaneously.

Figure 11:
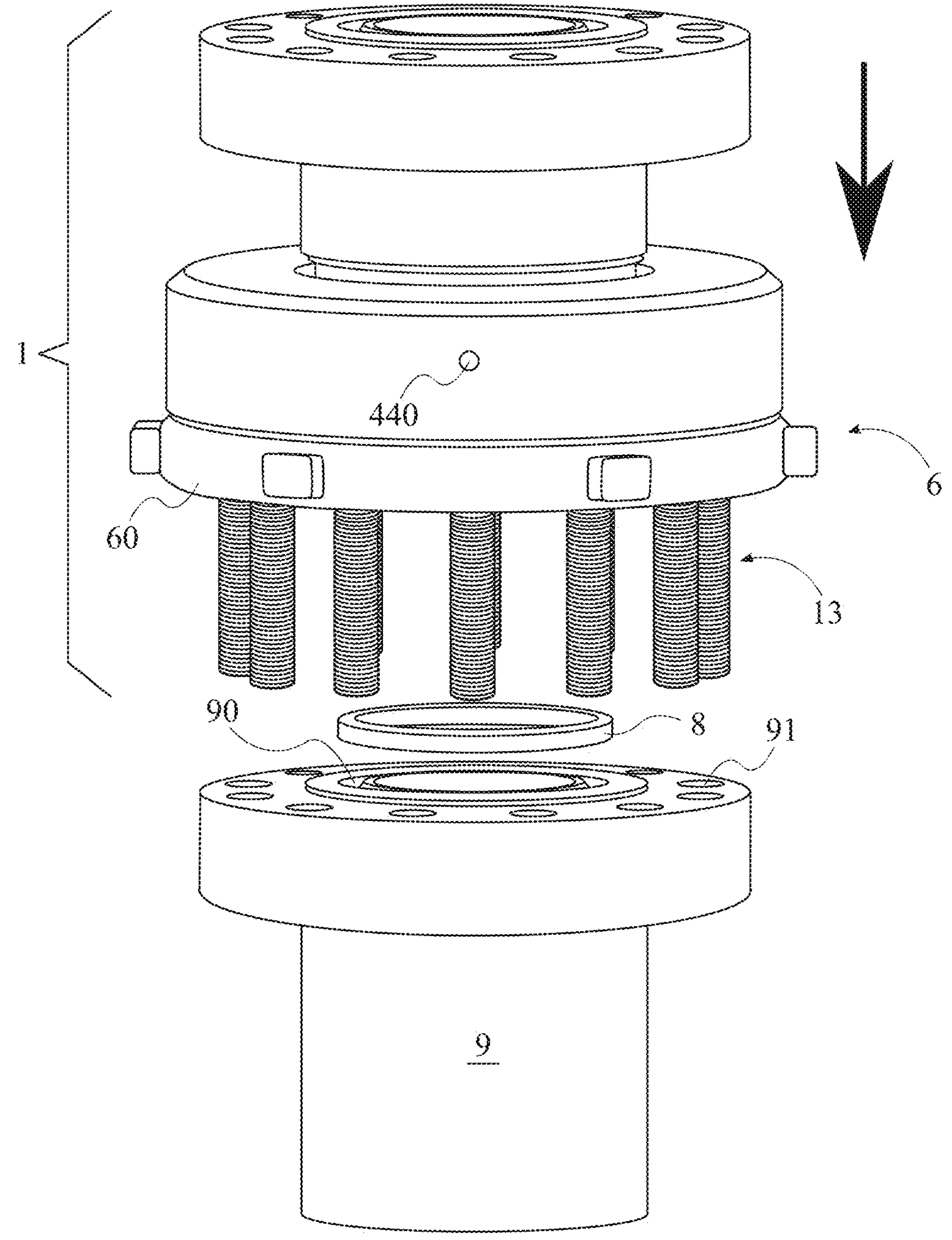
FIG. 11 is an illustration of the installation procedure of the present invention.
Figure 12:
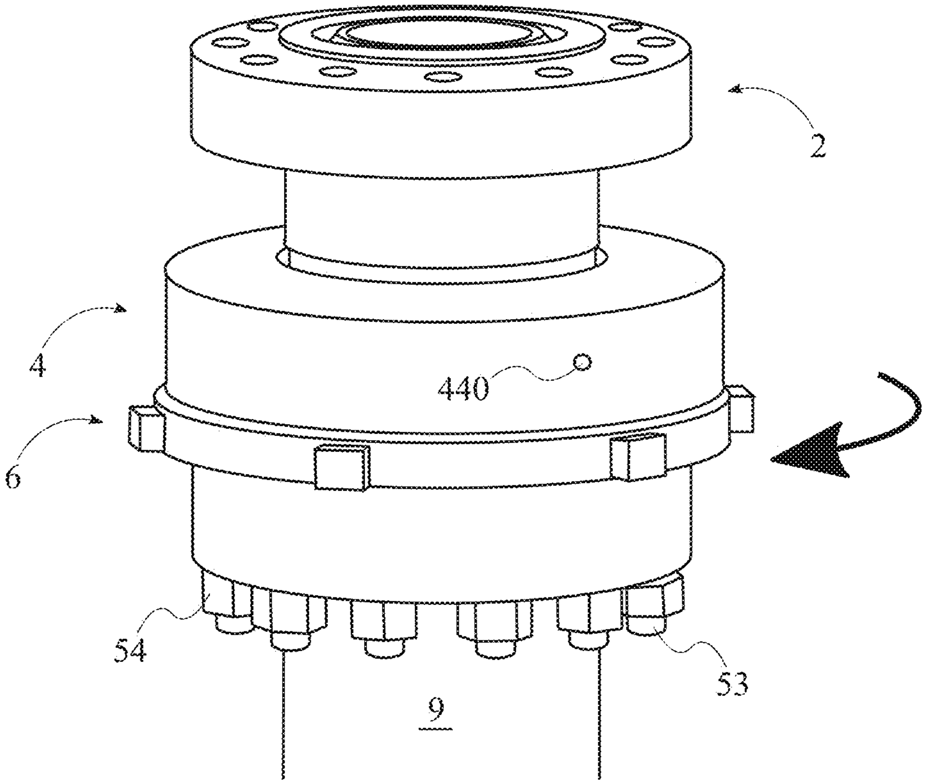
FIG. 12 is an illustration of the lock ring rotation procedure of the present invention.
Figure 13:
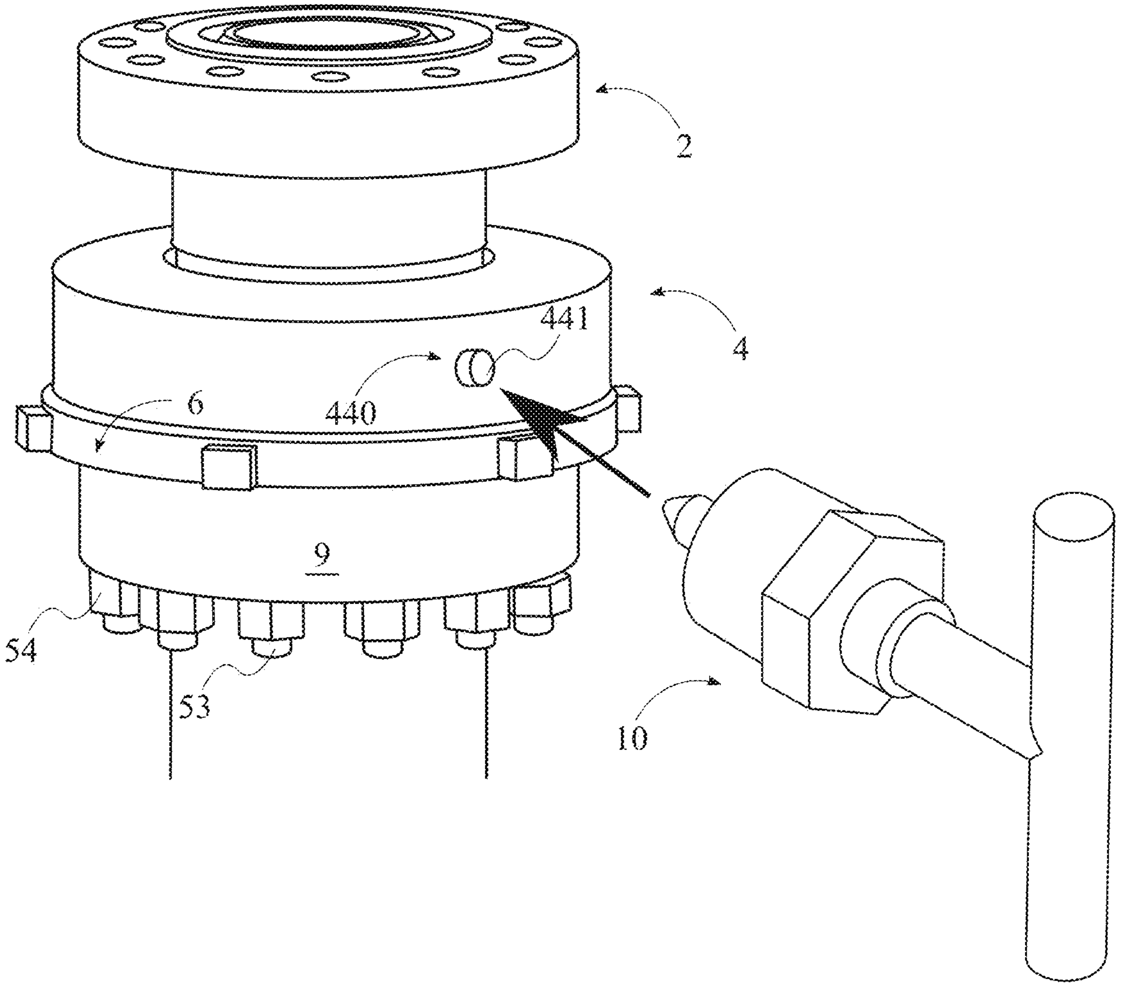
FIG. 13 is an illustration of the disconnection procedure of the present invention using a bleeding tool.

The present invention may be coupled to a mating flange 9 whereby the installation process of the present invention is as follows. Thoroughly clean the flange body surface 9 and ring groove 90 of a wellhead 9 component to which the hydraulic tension adapter 1 will be coupled. Ensure the plurality of studs 53 are fully extended and remove the plurality of stud protectors 55 from the second distal ends 532 of the studs 53. Ensure each of the plurality of stud assemblies 5 are secured and have been properly positioned within the present invention. Install the appropriate size ring gasket 8 into the ring groove 90 of the wellhead 9 component. Remove the plurality of nuts 54 from the plurality of studs 53. As can be seen in FIG. 11, carefully lower the present invention onto the wellhead 9 until the barrel 23 of the flange housing 2 of hydraulic tension adapter 1 lands on the ring gasket 8. In the preferred embodiment, turn the retainer ring 6 clockwise, as shown in FIG. 12, until the bolt tensioning piston 4 separates at least 1 inch from the retainer ring 6. Connect a hand pump into an upper most port 440 and raise the pressure to 500 PSI. Application of hydraulic pressure will translate the bolt tension piston 4 all way down and prepare the system for activation. After proper contact has been made, remove the hand pump from the bleed port 440, leaving the port 440 open to the atmosphere for the next operation step. Install the plurality of nuts 54 onto the plurality of studs 53 of the present invention until said nuts 54 are contacting the wellhead 9 flange 9. Remove the plugs 441 from the ports 440 and connect the hand pump to one of the plurality of supply/bleed ports 440, continue pumping until the system is void of all the air via an opposite port 440, install bleeding tool 10, and raise the pressure accordingly to activate the present invention once more. Each of the plurality of studs 53 will activate under such hydraulic pressure. Next, rotate the retainer ring 6 clockwise until it touches the top of the bolt tensioning piston 4. After the retainer ring 6 makes contact bolt tensioning piston 4, drain pressure using the bleeding tool 10, as shown in FIG. 13. Install the plugs 441 in the bleed ports 440. Proceed with the blowout preventer (BOP) test according to the customer procedure.

Figure 14:
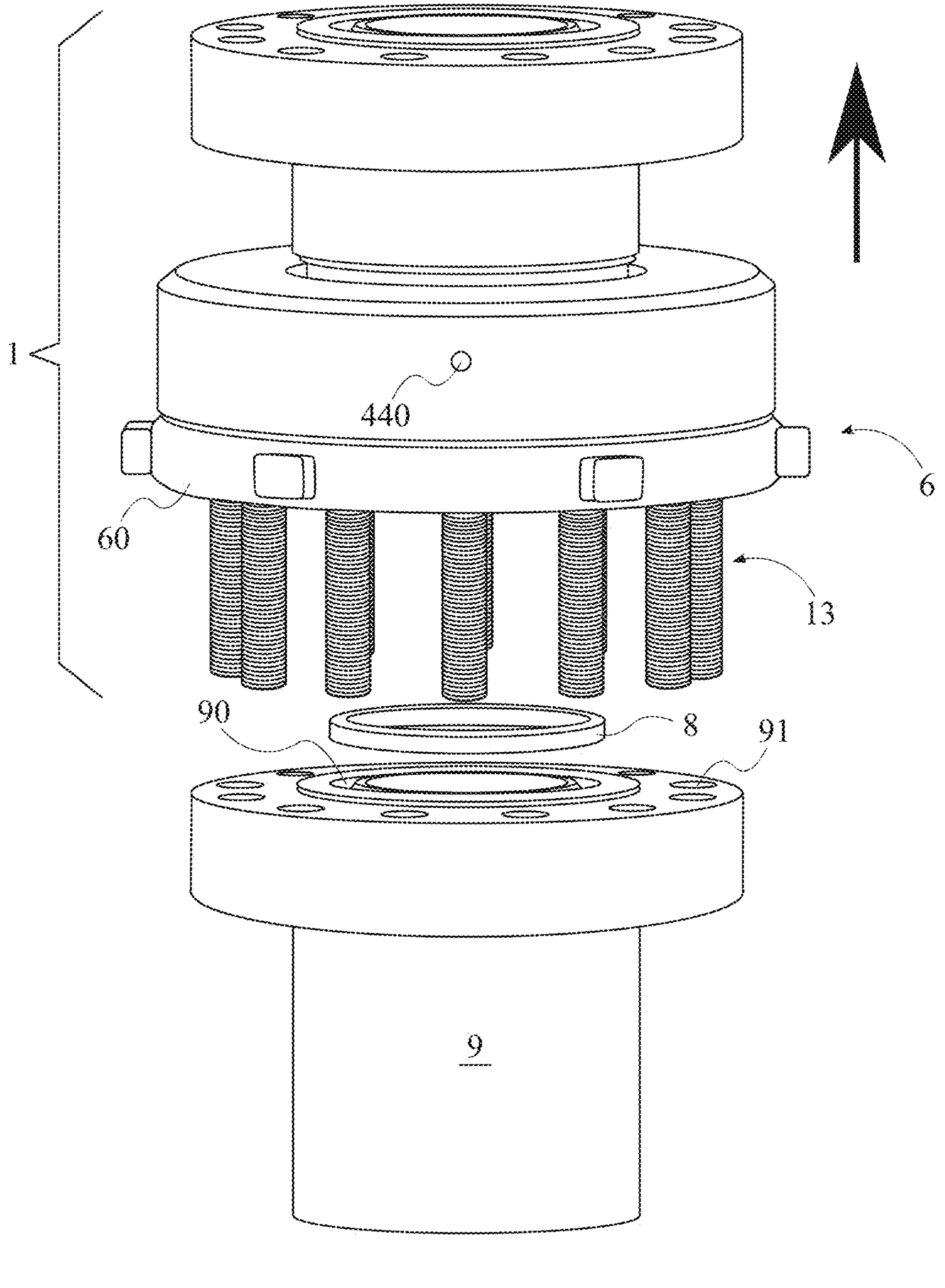
FIG. 14 is an illustration of the disassembly procedure of the present invention.

Contrarily, as shown in FIG. 14, the disassembly procedure of the present invention is as follows. Wash the system down to remove any mud and debris. As can be seen in FIG. 12, connect the hand pump to the supply port 440, raise the pressure at approximately 100 PSI more than the pressure set for activation, and rotate the retainer ring 6 to the counterclockwise until the retainer ring 6 separates from the bolt tensioning piston 4 at least 1 inch. As can be seen in FIG. 13, disconnect the present invention using the bleeding tool 10 inserted in one of the bleed ports 440 to drain hydraulic fluid and relieve all pressure. Turn the retainer ring 6 counterclockwise until the bolt tensioning piston 4 separates at least 1 inch from the retainer ring 6. Connect the hand pump into the upper most port 440 and raise the pressure to 500 PSI. Remove the plurality of nuts 54 from the plurality of studs 53. As can be seen in FIG. 14, disconnect all the ports 440 on the present invention, insert the plurality of plugs 441 into the plurality of ports 440. Place plurality of stud protectors 55 on each of the plurality of studs 53 when moving the present invention from one operation to the next protect the studs 53 from damage.

What is claimed is:

1. A hydraulic tension adaptor comprising:

a flange housing;

a bolt tensioning piston;

a bolt support retainer wherein said bolt support retainer is a threaded flange comprising a bore comprising internal threads;

a plurality of stud assemblies wherein each of the plurality of stud assemblies comprise:

a bolt retainer bushing;

a grub screw, a stud; and a nut; and a retainer ring wherein said retainer ring is a circular collar comprising an outward surface and an inward surface;

the flange housing is a T-shaped ring gasket with a plurality of ring grooves comprising:

a rim;

a center hole; and a barrel the bolt tensioning piston comprising a bolt tensioning piston housing and an aperture;

the rim of the flange housing is adjacent to the barrel wherein the rim is a disk-shaped member atop the barrel, wherein the barrel is an elongated tubular member extending perpendicularly from the rim;

the center hole traverses through the flange housing;

the bolt tensioning piston housing of the bolt tensioning piston is a disk-shaped member whereby the aperture is a through hole concentrically traversing the bolt tensioning piston; and the barrel of the flange housing traversing through the aperture of the bolt tensioning piston, whereby the bolt tensioning piston is located proximally upon the barrel of the flange housing;

bolt support retainer is a threaded flange comprising a bore comprising internal threads;

the barrel of the flange housing comprising external threads located on an outwardly facing surface of the barrel;

the bolt support retainer threadedly engaging with the external threads of the barrel of the flange housing;

the bolt tensioning piston housing of the bolt tensioning piston further comprising a top surface and a bottom surface wherein the top surface is oppositely parallel to the bottom surface;

the bottom surface of the bolt tensioning piston housing comprising a retainer recess wherein said recess houses at least a portion of the bolt support retainer;

the bolt retainer bushing is a housing comprising a cavity, a plurality of O-ring supports, and a shaft;

the cavity extends into the bolt retainer bushing housing of the bolt retainer bushing;

the shaft extends distally from the housing of the bolt retainer bushing;

the plurality of O-ring supports are a plurality of grooves wherein a plurality of O-rings are secured;

the stud is a threaded rod comprising a first end and a second end whereby the first end is opposite from the second end;

the first end of the stud being housed within the cavity of the bolt retainer bushing;

the grub screw threadedly securing the bolt retainer bushing to the stud;

the bolt support retainer further comprising a top face and a plurality of through holes, wherein said through holes traverse the bolt support retainer from the top face;

the bolt tensioning piston comprising a plurality of slots extending from the bottom surface of the housing wherein the plurality of slots are aligned with the plurality of through holes of the bolt retainer;

the plurality of stud assemblies traverses the plurality of through holes of the bolt support retainer and are received by the plurality of slots of the bolt tensioning piston whereby the shaft of the bolt retainer bushing is inserted into the plurality of slots;

the nut threadedly engaged, proximally, on the stud;

the outward surface being the outwardly facing circumferential surface of the collar;

the inward surface being the inwardly facing circumferential surface of the collar, opposite the outward surface;

the inward surface comprising threads whereby said threads of the retainer ring engage with an external thread of the bolt support retainer; and the external threads of the bolt support retainer being located on an outwardly facing surface of the threaded flange.

2. The hydraulic tension adaptor as claimed in claim 1, wherein the top surface of the of the bolt tensioning piston comprises a cutout circumferentially about the aperture wherein said cutout receives a secondary piston ring;

the secondary piston ring is fitted about the circumference of the barrel of the flange housing and sits within the cutout of the bolt tensioning piston.

3. The hydraulic tension adaptor as claimed in claim 2 wherein the bolt tensioning piston further comprises an outer face whereby the outer face is the outwardly facing circumferential surface of the bolt tensioning piston;

the outer face comprising an at least one bleed port; and the at least one bleed port removably receiving an at least one plug.

4. The hydraulic tension adaptor as claimed in claim 1, the barrel of the flange housing further comprising a plurality of O-ring supports of the flange housing and a plurality of O-rings of the flange housing;

the plurality of O-rings supports of the flange housing are grooves about the outwardly facing circumference of the barrel; and the plurality of O-rings of the flange housing being received by the plurality of O-ring supports of the flange housing.

5. The hydraulic tension adaptor as claimed in claim 4, the rim of the flange housing further comprising a top surface and a plurality of through holes of the flange housing whereby the plurality of through holes of the flange housing traverse the ring from the top surface.

6. The hydraulic tension adaptor as claimed in 1, the bolt support retainer further comprising an O-ring support and an O-ring wherein the O-ring support is a groove engraved into the outwardly facing surface of the bolt support retainer wherein receiving the O-ring.

7. The hydraulic tension adaptor as claimed in claim 1, the outward surface of the retainer ring comprising a plurality of retainer ring rotator blocks;

each retainer ring rotator block of the plurality comprises a plurality of seated screw holes wherein each seated screw hole comprises a lock washer and a shoulder bolt.

8. The hydraulic tension adaptor as claimed in claim 7 wherein the hydraulic tension adaptor is coupled to a mating flange;

the mating flange comprising a plurality of holes wherein the plurality of stud assemblies traverses;

the nut of the stud assemblies engages with the mating flange to secure the hydraulic tension adaptor to the mating flange.

9. A hydraulic tension adaptor comprising:

a flange housing;

a bolt support retainer; and a retainer ring;

the flange housing is T-shaped ring gasket with a plurality of ring grooves comprising:

a rim;

a center hole; and a barrel;

the bolt support retainer is a threaded flange comprising a bore and an outward surface;

the retainer ring is a circular collar comprising an outward surface and an inward surface;

the rim of the flange housing is adjacent to the barrel wherein the rim is a disk-shaped member atop the barrel, wherein the barrel is an elongated tubular member extending perpendicularly from the rim;

the center hole traverses through the flange housing;

the barrel of the flange housing comprising external threads located on an outwardly facing surface of the barrel;

the bore of the bolt support retainer comprises internal threads;

the outward surface of the bolt support retainer comprises external threads;

the bolt support retainer threadedly engaging with the external threads of the barrel of the flange housing;

the outward surface of the retainer ring being the outwardly facing circumferential surface of the collar;

the inward surface of the retainer ring being the inwardly facing circumferential surface of the collar, opposite the outward surface;

the inward surface of the retainer ring comprising threads whereby said threads of the retainer ring engage with the external threads of the bolt support retainer.

10. The hydraulic tension adaptor as claimed in claim 9, further comprising a bolt tensioning piston, wherein said bolt tensioning piston is a housing comprising:

an aperture;

a top surface;

a bottom surface; and an outer face;

the housing of the bolt tensioning piston is a disk-shaped member whereby the aperture is a through hole concentrically traversing the bolt tensioning piston;

the top surface of the of the bolt tensioning piston comprises a cutout, circumferentially about the aperture wherein said cutout receives a secondary piston ring;

the bottom surface of the housing of the bolt tensioning piston, the surface oppositely parallel from the top surface of the housing of the bolt tensioning piston, comprises a retainer recess and a plurality of slots wherein said recess houses at least a portion of the bolt support retainer;

the plurality of slots extending into the housing of the bolt tensioning piston;

the outer face is the outwardly facing circumferential surface of the bolt tensioning piston, comprising an at least one bleed port;

the barrel of the flange housing traversing through the aperture of the bolt tensioning piston, whereby the bolt tensioning piston is located proximally upon the barrel of the flange housing; and the secondary piston ring is fitted about the circumference of the barrel of the flange housing and sits within the cutout of the bolt tensioning piston.

11. The hydraulic tension adaptor as claimed in claim 10 further comprising a plurality of stud assemblies wherein each of the plurality of stud assemblies comprise:

a bolt retainer bushing;

a grub screw;

a stud; and a nut;

the bolt retainer bushing is a housing comprising a cavity, a plurality of O-ring supports, and a shaft;

the cavity extends into the housing of the bolt retainer bushing;

the shaft extends distally from the housing of the bolt retainer bushing;

the plurality of O-ring supports are a plurality of grooves wherein a plurality of O-rings are secured;

the stud is a threaded rod comprising a first end and a second end whereby the first end is opposite from the second end;

the first end of the stud being housed within the cavity of the bolt retainer bushing;

the grub screw threadedly securing the bolt retainer bushing to the stud;

the bolt support retainer further comprising a top face and a plurality of through holes, wherein said through holes traverse the bolt support retainer from the top face;

the bolt tensioning piston comprising a plurality of slots extending from the bottom surface of the housing wherein the plurality of slots are aligned with the plurality of through holes of the bolt retainer;

the plurality of stud assemblies traverses the plurality of through holes of the bolt support retainer and are received by the plurality of slots of the bolt tensioning piston whereby the shaft of the bolt retainer bushing is inserted into the plurality of slots; and the nut threadedly engaged, proximally, on the stud.

12. The hydraulic tension adaptor as claimed in claim 11, the outward surface of the retainer ring comprising a plurality of retainer ring rotator blocks;

each retainer ring rotator block of the plurality comprises a plurality of seated screw holes wherein each seated screw hole comprises a lock washer and a shoulder bolt.

13. The hydraulic tension adaptor as claimed in 11, the bolt support retainer further comprising an O-ring support and an O-ring wherein the O-ring support is a groove engraved into the outwardly facing surface of the bolt support retainer wherein receiving the O-ring.

14. The hydraulic tension adaptor as claimed in claim 11, the barrel of the flange housing further comprising a plurality of O-ring supports and a plurality of O-rings;

the plurality of O-rings supports are grooves about the outwardly facing circumference of the barrel; and the plurality of O-rings being received by the plurality of O-ring supports.

15. The hydraulic tension adaptor as claimed in claim 10 wherein the bolt tensioning piston further comprises an outer face whereby the outer face is the outwardly facing circumferential surface of the bolt tensioning piston;

the outer face of the bolt tensioning piston comprising an at least one bleed port; and the at least one bleed port removably receiving an at least one plug.

16. The hydraulic tension adaptor as claimed in claim 11 wherein the hydraulic tension adaptor is coupled to a mating flange;

the mating flange comprising a plurality of holes wherein the plurality of stud assemblies traverses;

the nut of the stud assemblies engages with the mating flange to secure the hydraulic tension adaptor to the mating flange.

17. A hydraulic tension adaptor comprising:

a flange housing;

a bolt support retainer;

a bolt tensioning piston; and a plurality of stud assemblies;

the flange housing is a T-shaped ring gasket with a plurality of ring grooves comprising:

a rim;

a center hole; and a barrel;

the bolt support retainer is a threaded flange comprising a bore and an outward surface;

the bolt tensioning piston is a housing comprising:

an aperture;

a top surface;

a bottom surface; and an outer face comprising an at least one bleed port wherein said bleed port removably receives an at least one plug;

of the plurality of stud assemblies, each of the plurality of stud assemblies comprise:

a bolt retainer bushing;

a grub screw;

a stud; and a nut;

the rim of the flange housing is adjacent to the barrel wherein the rim is a disk-shaped member atop the barrel, wherein the barrel is an elongated tubular member extending perpendicularly from the rim;

the center hole traverses through the flange housing;

the barrel of the flange housing comprising external threads located on an outwardly facing surface of the barrel;

the bore of the bolt support retainer comprises internal threads;

the outward surface of the bolt support retainer comprises external threads;

the bolt support retainer threadedly engaging with the external threads of the barrel of the flange housing;

the housing of the bolt tensioning piston is a disk-shaped member whereby the aperture is a through hole concentrically traversing the bolt tensioning piston;

the top surface of the of the bolt tensioning piston comprises a cutout, circumferentially about the aperture wherein said cutout receives a secondary piston ring;

the bottom surface of the housing of the bolt tensioning piston, the surface oppositely parallel from the top surface of the housing of the bolt tensioning piston, comprises a retainer recess and a plurality of slots wherein said recess houses at least a portion of the bolt support retainer;

the plurality of slots extending into the housing of the bolt tensioning piston;

the outer face of the bolt tensioning piston is the outwardly facing circumferential surface of the bolt tensioning piston;

the barrel of the flange housing traversing through the aperture of the bolt tensioning piston, whereby the bolt tensioning piston is located proximally upon the barrel of the flange housing;

the secondary piston ring is fitted about the circumference of the barrel of the flange housing and sits within the cutout of the bolt tensioning piston;

the bolt retainer bushing is a housing comprising a cavity, a plurality of O-ring supports, and a shaft;

the cavity extends into the housing of the bolt retainer bushing;

the shaft extends distally from the housing of the bolt tensioning piston;

the plurality of O-ring supports are a plurality of grooves wherein a plurality of O-rings are secured;

the stud is a threaded rod comprising a first end and a second end whereby the first end is opposite from the second end;

the first end of the stud being housed within the cavity of the bolt retainer bushing;

the grub screw threadedly securing the bolt retainer bushing to the stud;

the bolt support retainer further comprising a top face and a plurality of through holes, wherein said through holes traverse the bolt support retainer from the top face;

the bolt tensioning piston comprising a plurality of slots extending from the bottom surface of the housing of the bolt tensioning piston wherein the plurality of slots are aligned with the plurality of through holes of the bolt retainer;

the plurality of stud assemblies traverses the plurality of through holes of the bolt support retainer and are received by the plurality of slots of the bolt tensioning piston whereby the shaft of the bolt retainer bushing is inserted into the plurality of slots; and the nut threadedly engaged, proximally, on the stud.

* * * * *